United States Patent
Gopal et al.

(10) Patent No.: US 8,271,570 B2
(45) Date of Patent: Sep. 18, 2012

(54) UNIFIED INTEGER/GALOIS FIELD (2M) MULTIPLIER ARCHITECTURE FOR ELLIPTIC-CURVE CRYTPOGRAPHY

(75) Inventors: Vinodh Gopal, Westboro, MA (US); Erdinc Ozturk, Worcester, MA (US); Gilbert Wolrich, Framingham, MA (US); Wajdi K. Feghali, Boston, MA (US)

(73) Assignee: Intel Corporation, Santa Clara, CA (US)

( * ) Notice: Subject to any disclaimer, the term of this patent is extended or adjusted under 35 U.S.C. 154(b) by 1390 days.

(21) Appl. No.: 11/772,166

(22) Filed: Jun. 30, 2007

(65) Prior Publication Data

US 2009/0006517 A1    Jan. 1, 2009

(51) Int. Cl.
*G06F 7/00* (2006.01)
(52) U.S. Cl. ........................................................ 708/492
(58) Field of Classification Search ............ 708/491–492
See application file for complete search history.

(56) References Cited

U.S. PATENT DOCUMENTS

| | | | |
|---|---|---|---|
| 6,269,384 B1 * | 7/2001 | Oberman | 708/524 |
| 6,349,318 B1 * | 2/2002 | Vanstone et al. | 708/492 |
| 7,277,540 B1 * | 10/2007 | Shiba et al. | 708/492 |
| 2004/0177105 A1 * | 9/2004 | Satoh et al. | 708/620 |

OTHER PUBLICATIONS

A. Menezes, "Efficient Implementation", Handbook of Applied Cryptography, Chapter 14, 1997, pp. 591-634.
M. Brown et al., "Software Implementation of the NIST Elliptic Curves Over Prime Fields", Lecture Notes in Computer Science: vol. 2020. Proceedings of the 2001 Conference on Topics in Cryptology The Cryptographer's Track at RSA, Springer Verlang, 2001, pp. 250-265.
CERTICOM Corp., Standards for Efficient Cryptography, "SEC 1. Elliptic Curve Cryptography", Version 1.0, Sep. 20, 2000, 96 pages.
Federal Information Processing Standards Publication 186-3, National Institute of Standards and Technology, Jun. 2009, 130 pages.

* cited by examiner

*Primary Examiner* — Tan V. Mai
(74) *Attorney, Agent, or Firm* — Grossman, Tucker, Perreault & Pfleger, PLLC

(57) ABSTRACT

A unified integer/Galois-Field $2^m$ multiplier performs multiply operations for public-key systems such as Rivert, Shamir, Aldeman (RSA), Diffie-Hellman key exchange (DH) and Elliptic Curve Cryptosystem (ECC). The multiply operations may be performed on prime fields and different composite binary fields in independent multipliers in an interleaved fashion.

16 Claims, 9 Drawing Sheets

UNIFIED INTEGER/GALOIS FIELD (2M) MULTIPLIER ARCHITECTURE FOR ELLIPTIC-CURVE CRYTPOGRAPHY

FIELD

This disclosure relates to public key cryptography and in particular to elliptic curve cryptography.

BACKGROUND

Public key cryptography is typically used for secure communications over the Internet, for example, to distribute secret keys used in cryptographic algorithms. Public key cryptography is also used in digital signatures to authenticate the origin of data and protect the integrity of that data. Commonly used public key algorithms include Rivert, Shamir, Aldeman (RSA) and Diffie-Hellman key exchange (DH). The public key algorithm may be used to authenticate keys for encryption algorithms such as the Data Encryption Standard (DES) and the Advanced Encryption Standard (AES).

RSA and DH provide security based on the use of number theory. RSA is based on factoring the product of two large prime numbers. DH is based on a discrete logarithm for finite groups. Typically, public key systems use 1024-bit parameters for RSA and DH.

The Elliptic Curve Cryptosystem (ECC) is a relatively new public key algorithm that is based on the arithmetic of elliptic curves. ECC provides the same level of security as RSA and DH but uses parameters having fewer bits than parameters used by RSA or DH. For example, to authenticate an 80-bit key, 1024-bit parameters are recommended for the RSA and DH public key algorithms and 160-bit parameters are recommended for the ECC algorithm. For a 128-bit key 3072-bit parameters are recommended for the RSA and DS public key algorithms and 224-bit parameters are recommended for the ECC algorithm.

Elliptic curve cryptography (ECC) provides more security than traditional cryptosystems based on integer fields for much smaller key-sizes. It is very efficient from the perspectives of computes, power, storage and bandwidth to transmit keys. It scales much better than the traditional schemes and is therefore likely to gain more popularity with increased need for higher security strengths. Elliptic curves are algebraic/geometric objects that have been extensively studied by mathematicians. These curves can be applied to cryptography by suitably defining the underlying field and constraining the parameters such that the points on the curve form a Group (suggested in 1985 independently by Neil Koblitz and Victor Miller).

Elliptic curves for cryptographic applications are defined over prime fields (Galois Field Prime (GFP)) and binary fields (Galois Field Binary (GF2m)) GFP and GF2m both have a finite number of points that form a mathematical Group structure. The points can be operated on by special "addition" or "subtraction" operations. For any two points P1 and P2 in the group: P3=P1+P2 is defined. After point-addition has been defined, the basic building blocks of any cryptosystem are computations of the form Q=[k]P. The operation [k]P may be referred to as scalar point multiplication. This can be defined as P added to itself (k−1) times. Note that $1<=k<ord(P)$, where "ord" is defined as the order of the element of the group. Given P and [k]P, it is computationally infeasible to recover k.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Federal Information Processing Standard (FIPS) 186-3 describes standard National Institute of Standards and Technology (NIST) elliptic curves. For example, there are standard NIST ECC curves for prime field sizes of 192, 224, 256, 384 and 521 bits and for binary field sizes of 163, 233, 283, 409 and 571 bits.

An ECC computation involves modular arithmetic operations on an elliptic curve over a finite field. A finite field consists of a finite set of elements. Modular addition and multiplication operations may be performed on pairs of field elements. There is one finite field containing q elements if and only if q is a power of a prime number. A prime finite field is a field with q=p, where p is an odd prime.

The elements of the prime finite field may be represented by the set of integers $\{0, 1, \ldots, p-1\}$ with addition defined as a+b=r mod p. The "mod p" refers to addition modulo p where r is the remainder when the integer a+b is divided by p. Multiplication is defined as a·b=s mod p and may be performed on prime fields using an integer multiplier or on binary fields using a Galois-Field ($2^m$) multiplier.

The multiplication operation involves multiplying a multiplier by a multiplicand and adding the result of the multiplication operation to an accumulator. For example the operation below adds the result of multiplying n-bits of B (multiplicand) by k-bits of A (multiplier) to P (accumulator): P[k+n−1:0]+=A[k−1:0].times.B[n−1:0]

The parameter n may be 512 bits and k may be a convenient word size, for example, 64-bits. The number of times that this operation is performed for each word size k is dependent on the number of digits in the multiplicand; that is, on the value of n. For example, with a word size of 64-bits, the operation is performed (8.times.n) times for a 512-bit multiplier (n=512).

The multiplication operation is slow because it requires multiple clock cycles. Also, if a single multiplier is provided to perform both binary multiplication and integer multiplication due to the need to handle carries for integer multiplication, optimizations such as booth coding to reduce the number of cycles cannot be used.

An embodiment of a PKE unit according to the principles of the present invention includes an integer multiplier and a Galois-Field ($2^m$) (GF2) multiplier that are shared by a plurality of MMPs.

Figure 1:
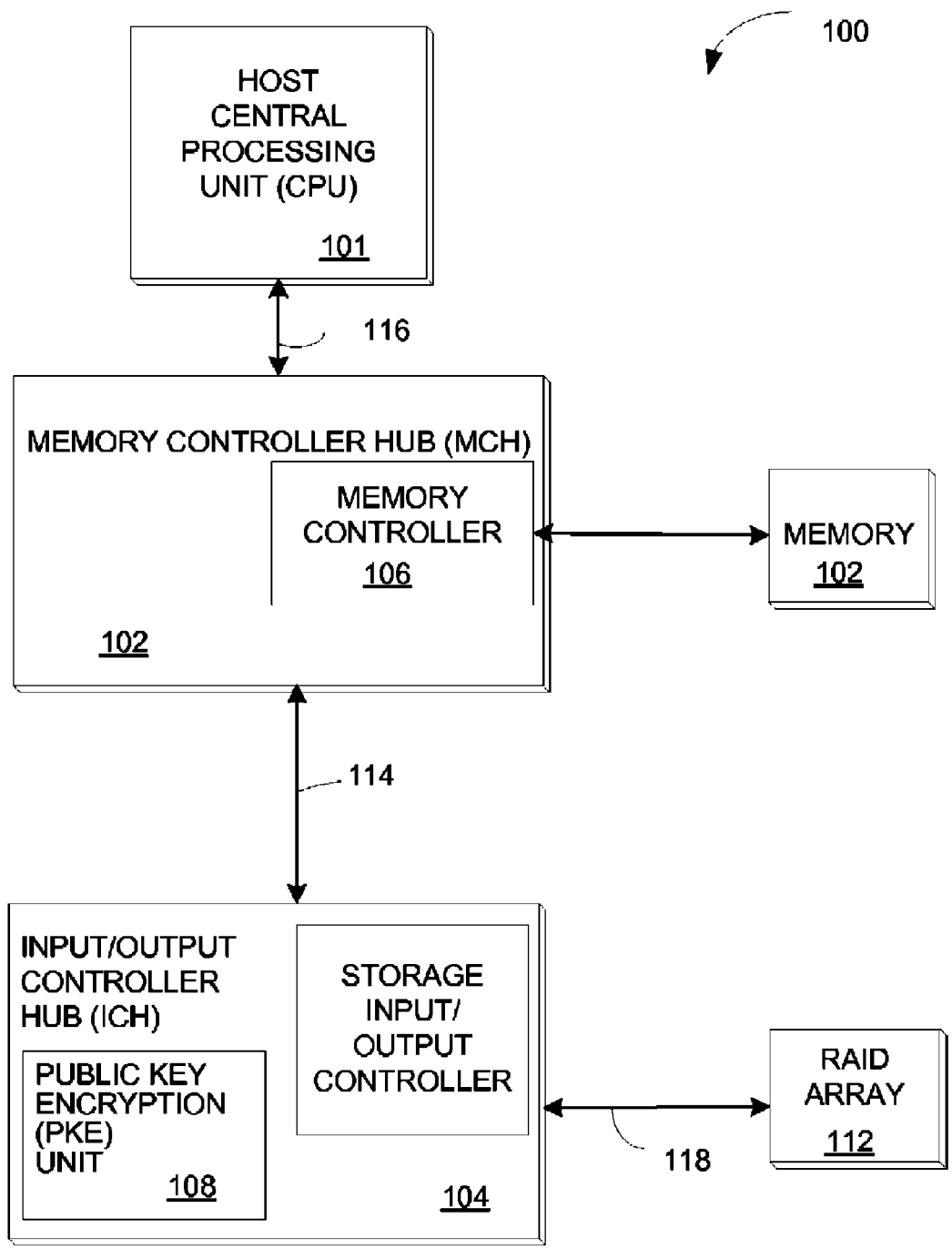
FIG. 1 is a block diagram of a system that includes an embodiment of a public key encryption (PKE) unit.

FIG. 1 is a block diagram of a system 100 that includes an embodiment of a Public Key Encryption (PKE) unit 108. The system 100 includes a processor 101, a Memory Controller Hub (MCH) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

Figure 2:
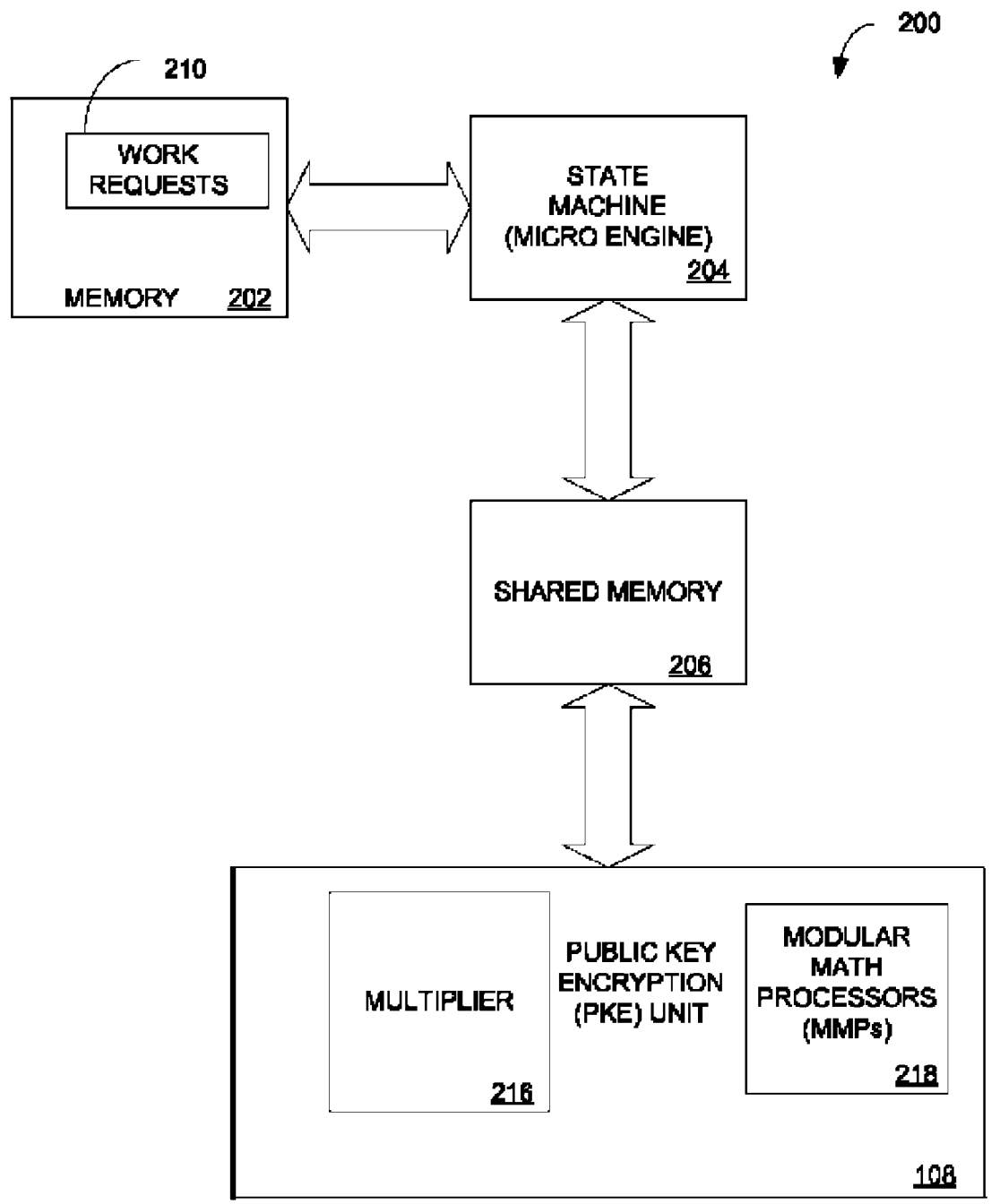
FIG. 2 is a block diagram of an embodiment of a system that includes the public key encryption (PKE) unit shown in FIG. 1.

FIG. 2 is a block diagram of an embodiment of a system 200 that includes the public key encryption (PKE) unit 108 shown in FIG. 1.

The system 200 includes a memory 202 for storing work requests 210 and a state machine (micro engine) 204 which processes the work requests 210. The state machine 204 issues instructions to the PKE unit 108 through a shared memory 206.

In one embodiment the state machine 204 may be one of a plurality of micro engines in a processor, for example, a micro engine in an IXP® 2400 processor available from Intel Corporation. The PKE unit 108 offloads computationally expensive operations from the state machine (micro engine) 204.

The memory 202 and the shared memory 206 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

Based on a work request 210 stored in memory 200, the state machine 204 may offload computationally expensive operations in Diffie-Hellman key exchange (DH), Digital Signature Algorithm (DSA) digital signature, Rivest, Shamir, Adleman (RSA) encryption/decryption and primality testing to the PKE unit 108.

The PKE unit 108 includes one or more modular math processors (MMP) 218 and multipliers 216. The PKE unit 208 may perform modular arithmetic on large numbers. An example of modular arithmetic is a modular exponential operation such as, $g^e$ mod m where g is the base, e is the exponent and m is the modulus.

Figure 3:
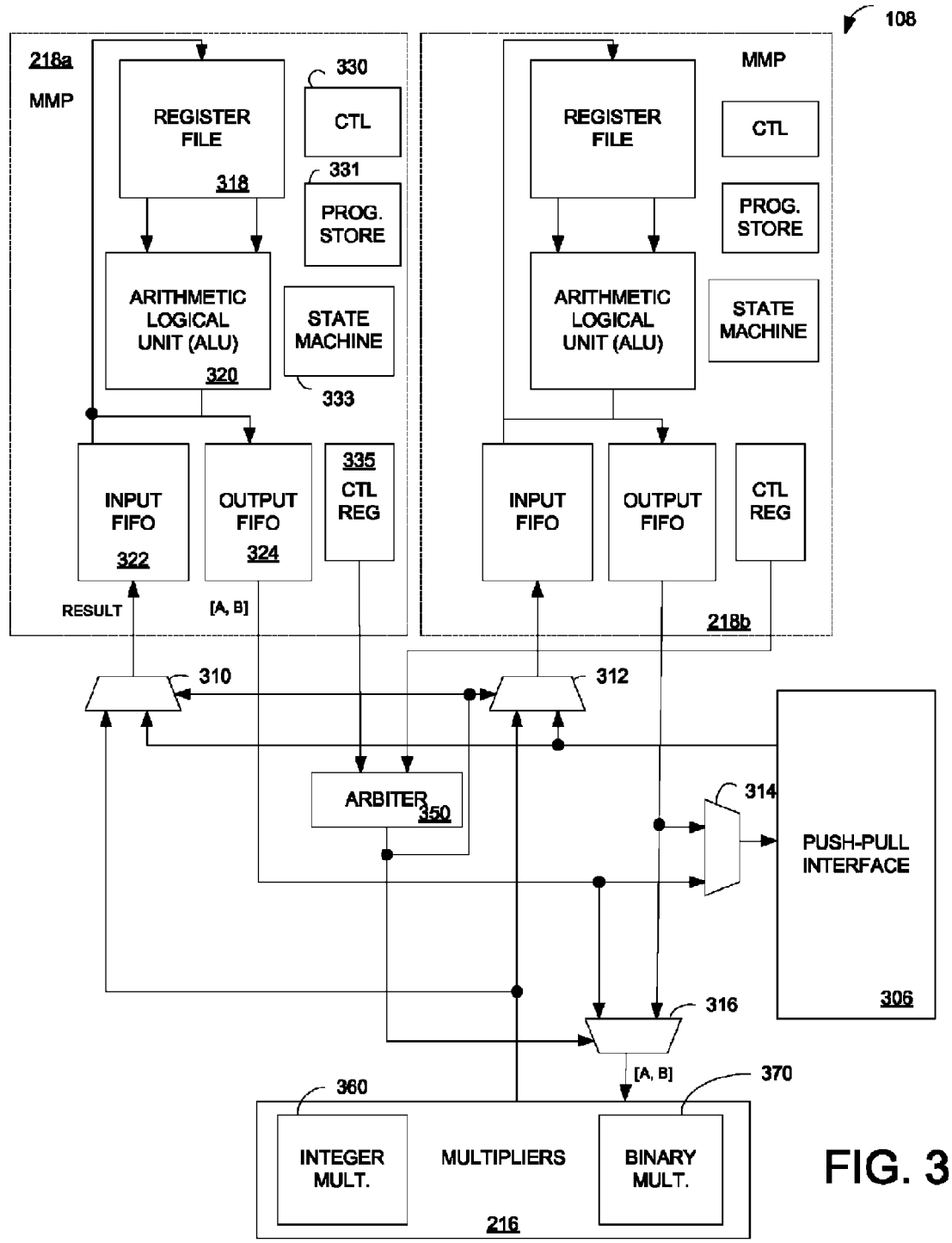
FIG. 3 is a block diagram of an embodiment of the PKE unit shown in FIG. 2 that includes a multiplier according to the principles of the present invention.

FIG. 3 is a block diagram of an embodiment of the PKE unit 108 shown in FIG. 2 that includes a multiplier according to the principles of the present invention. In the embodiment shown, the PKE unit 108 includes two modular math processors (MMPs) 218a, 218b. However, the PKE unit 108 is not limited to two MMPs 218a, 218b, in other embodiments, the PKE unit 108 may have more than two MMPs.

The PKE unit 108 performs computationally expensive mathematical computations such as modular exponentiation, division and greatest common divisor (gcd). The PKE unit 108 also includes multipliers 216, which is shared by the MMPs 218a, 218b.

Each MMP 218a, 218b includes a respective input First In First Out (FIFO) 322 and an output FIFO 324. The communication path through each MMP 218a, 218b is through the FIFOs 322, 324. Data is enqueued to the input FIFO 322 and dequeued from the output FIFO 324. The states of the MMPs 218a, 218b are independent from each other. Each MMP 218a, 218b may be concurrently transferring data to/from shared memory 206 (FIG. 2) through a push-pull interface 306.

The multipliers 216 may be accessed by the MMPs 218a, 218b via an internal PKE bus and an arbitration mechanism that includes multiplexers 310, 312, 314 and 316 and associated arbitration logic (arbiter) 350. As the multipliers 216 are shared by the MMPs 218a, 218b, the arbiter 350 controls which MMP 218a, 218b is currently using the multipliers 216.

The operand size for each MMP 218a, 218b is configurable through the control logic 330, program store 331 and state machine 333. In one embodiment the operand size may be configured to be 256 or 512 bits. The type of multiply operation is also configurable. In one embodiment, the type of multiply operation performed by the multipliers 216 for a particular MMP 218a, 218b may be unsigned integer or GF2 (carry-less). Based on the configured operand size and multiply operation for a particular MMP 218a, 218b, the MPP 218a, 218b operates on the required length result vectors without explicit command encodings. For example, the control store 330 of one of the MMPs 218a, 218b may be configured to perform scalar point multiplication for all prime field sizes less than 521 bits.

The control program store 330 stores code (instructions) that includes instructions for performing a multiply operation. While the MMP 218a, 218b is in run-mode, the MMP command state-machine 333 enqueues multiply operations in the output FIFO 324 for processing by the multipliers 216, with the type of multiply operations to be performed being dependent on the code stored in the control program store 331.

Various programs may be loaded into each MMP's respective control store 331. For example, a program for prime-fields that performs scalar point multiplication that works efficiently for all prime ECC sizes greater than 521 bits may be loaded into the control store 330 of the MMP 218a, 218b to perform ECC operations. A program for binary/Kobitz ECC curves that performs scalar point multiplication that works efficiently for all binary ECC sizes greater or equal to 512 bits may be loaded into the control store 330 of the MMP 218a, 218b to perform ECC operations.

Other programs that may be loaded into the control store 330 of the MMP 218a, 218b include programs for conversions from projective co-ordinate spaces to affine space for prime and binary ECC and a programs for normal-polynomial basis conversions without requiring specialized normal-basis multiplier hardware for binary curves specified in normal basis.

The multipliers 216 that are shared by the MMPs 218a, 218b include two independent multipliers, an integer multiplier 360 for performing integer multiplication operations and a binary multiplier 370 for performing binary multiplication. The multipliers 216 may operate in one mode (integer/binary) with MMP 218a and another mode with MMP 218b in an interleaved fashion with the selection of the mode of operation (binary/integer) being made prior to sending each problem to the multipliers 216.

For example, MMP 218a may be performing a binary ECC operation on binary field size of 233 bits, thus requiring the multipliers 216 to be configured for 256 bits, Galois Field ({256b, GF*}) mode multiplication with the multiplication operation being performed by the binary multiplier 370. In GF mode, the binary multiplier 370 performs a GF carryless multiplication operation. MMP 218b may be operating on 384-bit prime field size, requiring the multipliers 216 to be set in 512 bit, integer ({512b, int*}) mode. In integer mode, the integer multiplier 360 performs an integer multiply operation using unsigned integer multipliers in redundant form. The integer multiplication operation performed by the integer multiplier 360 and the GF carryless multiplication operations performed by the binary multiplier 370 are supported concurrently in an interleaved fashion for the respective MMP 218a, 218b that has exclusive access to the multipliers 216.

Furthermore, each MMP 218a, 218b may be configured to perform one of a plurality of reduction techniques, such as, Barrett Reduction or Montgomery Reduction to perform scalar point multiplication.

Each MMP 218a, 218b has three modes of operation controlled by the MMP state machine 333: sleep, Input/Output (IO) and run. For example, when the MMP 218a is in sleep mode, MMP 218b may be initialized by loading control words into the control store 330. After the last control word is loaded into the control store 330, the MMP 218b transitions to I/O mode.

In IO mode, data is loaded into the MMP 218a, 218b by enqeuing it in the input FIFO 322. Results may be returned through the push pull interface 306 by writing them to the output FIFO 324.

When the MMP 218a, 218b is in run mode, the MMP 218a, 218b only communicates with the multipliers 216 to perform math operations. For efficient computation, one MMP 218a, 218b may be in run mode while the other MMP 218a, 218b is in IO/sleep mode.

The initialization procedure includes enqueuing three phases of data to the MMP's input FIFO 322. The first phase is a preamble that includes configuration information. In one embodiment, 128-bits of configuration information are sent to the MMP 218a, 218b. The second phase is a control store binary to be stored in program store 331 and executed by the MMP state machine 333. The third phase is the input data for use by the stored control store binary.

When the MMP 218a, 218b is in run mode, the selected one of the multipliers 216 dequeues operands from the output FIFO 324. In an embodiment, there are two operands each having 512-bits that are enqueued side-by-side in the output FIFO 324. There is also a control register 335 that stores a Hold/Release indicator (for example, a single bit) per operand indicates whether the selected one of the multipliers 216 is to continue servicing that MMP 218a, 218b or to service a different MMP 218a, 218b. Thus, the Hold/Release indicator allows the MMPs 218a, 218b to share the multipliers 216.

The control register 335 may also store carry-bits per operand and an indication (for example, one bit) of the size of the multiplicand (256 or 512) and the operation type (int/GF2) per operand. Logically these appear to be part of the output FIFO 324. The MMP 218a, 218b makes a function call to the multiplier (MUL) symbolically as:

result=$MUL$(A,B,extra-carry-bits,hold/release,size, operation-type)

The operands A, B are stored in the output FIFO 324 and the extra-carry-bits, hold/release, size and operation-type indicators are stored in the control register 335 and read by the selected one of the multipliers 216. In an embodiment, the control information 330 may be written by the MMP 218a, 218b each time the MMP 218a, 218b queues a problem for the multipliers 216. The selected one of the multipliers 216 pulls the control information from the control register 335 for a problem and pulls the operands for the problem from the output FIFO 324.

In an embodiment, the multipliers 216 provide the functionality of a 515 by 515 multiplier with a throughput of one multiply operation per sixteen cycles (that is, 512 bits, 32 bits at a time). The arbiter 350 allows requests to perform a multiply operation on operands (A, B) to be received from a single MMP 218a, 218b as long as the hold/release indicator in the control register 335 associated with a set of operands (A, B) for a particular problem is set to "hold". After an MMP 218a, 218b changes the hold/release indicator to "release", the arbiter 350 chooses another MMP 218a, 218b to service in round robin fashion based on the last MMP 218a, 218b to be serviced and the state of each MMP's respective hold/release indicator.

The multiplier may operate on 256-bit operands. However, as the multiplier always performs a fixed size multiply, this requires padding of the 256 Most Significant Bits (MSBs) of the operands with zeros.

In an embodiment, the MMP 218a, 218b is a 64-bit vector processor which is optimized to perform operations on arbitrarily large integers in the range of 64 to 4096-bits. It uses instruction words which are either sixteen or thirty-two bits long. In an embodiment, the register file 318 has two 2 kB data memory (for example, Random Access Memory (RAM)) for storing operands (A and B bank) and a 1 kB control store memory. The input FIFO 322 and the output FIFO 324 each are 0.25 kB. The MMP 218a, 218b also includes a general purpose ALU 320.

Figure 4:
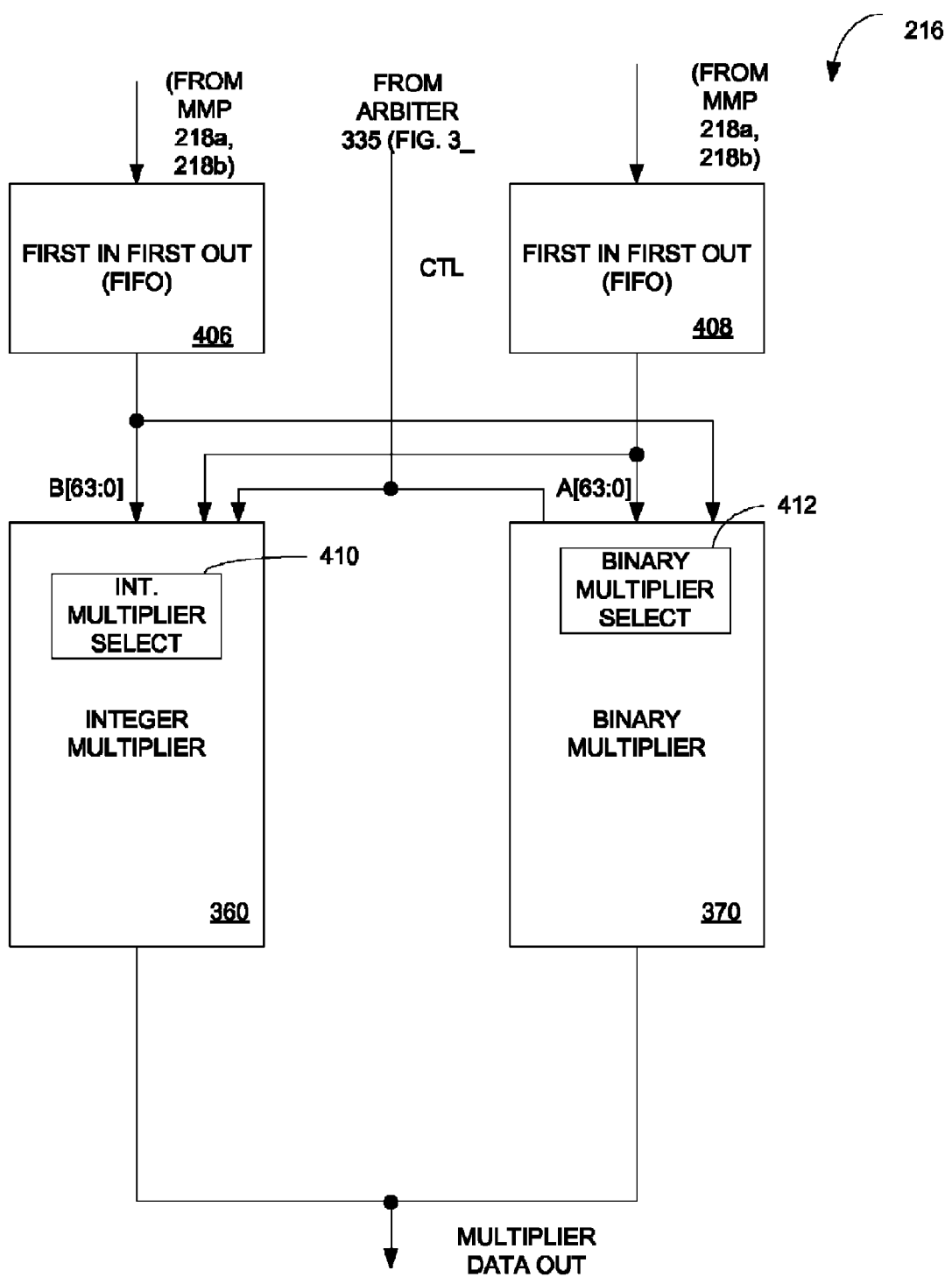
FIG. 4 is a block diagram of an embodiment of the multiplier shown in FIG. 3.

FIG. 4 is a block diagram of an embodiment of the multipliers 216 shown in FIG. 3. As shown, the multiplier includes an integer multiplier and a binary multiplier 370. The binary multiplier 370 is a Galois-field-2 (GF2) "carry-less" multiplier for performing binary ECC operations. The integer multiplier 370 is a "carry save" multiplier that includes at least one 64*64 carry save adder (CSA) multiplier. A CSA provides a result in redundant form, that is, partial sum bits and carry bits.

In an embodiment, the binary multiplier 370 includes a core GF2 64*64 multiplier. In another embodiment, the binary multiplier 370 includes a core GF2 32*32 multiplier. The core GF2 multiplier may support both 64*64 and 32*32 with one being selectable during an initialization time or may be dynamically modifiable during runtime. This carry-less 64*64 multiplier is independent from the CSA multiplier(s)

in the integer multiplier 360. Each of the multipliers 360, 370 can therefore be optimized independently for the critical path.

Operands for multiply operations to be performed by the multiplier are dequeued from the output FIFO 324 in the MMP 218a, 218b that is currently in run mode and stored in FIFOs 406, 408. In an embodiment, each operand has sixteen-longword vectors that are stored in the output FIFO 324 in the MMP 218a, 218b.

There are a plurality of MMP instructions including an execute (exec) instruction and a FIFO_IN execute (fexec) instruction. The exec and fexec instructions specify source and destination operands and a hold/release indicator that when used in conjunction with the output FIFOs 324 in the MMP 218a, 218b indicates whether there will be more multiplications. This allows one MMP 218a, 218b to increase efficiency by bursting problems to the multipliers 216.

Whenever an operand is sent to one of the FIFOs as a result of the MMP executing an exec instruction, a hold/release (H/R) indicator is also enqueued. For example, in one embodiment, the hold/release indicator is a separate 1-bit FIFO per output FIFO that enqueues the H/R indicator that accompanies each operand that is enqueued by the exec instruction. The multipliers 216 are held by the current MMP 218a, 218b if the H/R indicator associated with either the A or B operand is set to hold. The H/R indicator may only be set/reset by an exec instruction execution in the MMP 218a, 218b.

When the MMP 218a, 218b is in run mode, the MMP 218a, 218b communicates solely with the selected one of the multipliers 216 and continues to "own" exclusive servicing of problems by the selected one of the multipliers 216 while the H/R indicator is set to "hold". In a system with at least two MMPs 218a, 218b, while one MMP 218a, 218b is in run mode with exclusive servicing of multiplication problems by the selected one of the multipliers 216, the other MMP 218a, 218b may be in IO/Sleep mode transferring data through the push-pull interface 306.

In an embodiment, the output FIFO 324 in the MMP 218a, 218b can store two operands to be operated on by the selected one of the multipliers 216 and the input FIFO 322 in the MMP 218a, 218b can store two results that are being received from the multipliers 216. The operands may be enqueued in the output FIFO 324 in the MMP 218a, 218b by an exec instruction.

In an embodiment, the multipliers 216 are 515 by 515 multipliers with a throughput of one multiply per sixteen cycles. The selected one of the multipliers 216 continues to pull multiply problems (requests) from a single MMP 218a, 218b as long as the hold/release indicator for the MMP 218a, 218b is set to "hold", for example, set to logic '1'. After the MMP 218a, 218b releases the multipliers 216 by changing the state of its respective hold/release indicator, the arbiter 335 chooses from the other MMPs 218a, 218b in round robin fashion. The arbiter 335 forwards indicators for the problem from the respective control register 335 of the MMP 218a, 28b to the multipliers 216. These indictors include an indication as to type of multiply operation (integer or binary multiplication) and the size of the multiplicand (256 or 512 bits).

The indicators are pulled by the multipliers 216 into multiplier select logic 410, 412. The integer multiplier 360 or the binary multiplier 370 is enabled dependent on the state of the type of multiplication operation (integer or binary) received from the control signals. Only one of the multipliers 360, 370 is enabled to perform the multiplication problem for the MMP 218a, 218b.

Figure 5:
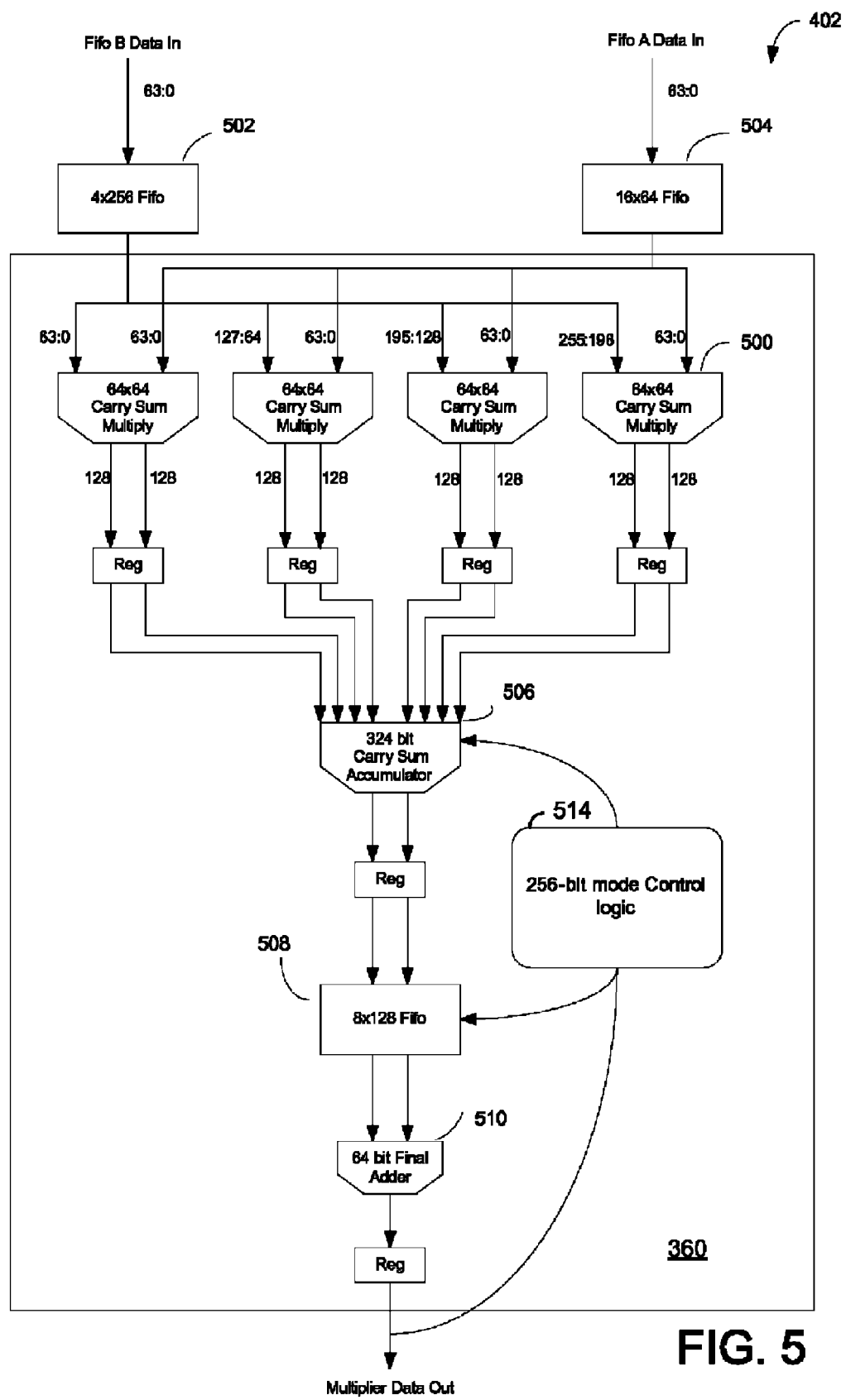
FIG. 5 is a block diagram of an embodiment of the integer multiplier shown in FIG. 4.

FIG. 5 is a block diagram of an embodiment of the integer multiplier 360 shown in FIG. 4.

The integer multiplier 360 includes four 67-bit carry save multipliers 500 and is configured to perform a 67 bit×259 bit multiply every clock cycle. The 515 bit operand data is written into the four 67-bit carry save multipliers 500 in 8 clock cycles. An integer multiplier state machine includes 256-bit mode control logic 514. The integer multiplier state machine drives decode logic used to generate the operand memory read addresses, clear and shift the accumulator result and generate the accumulator FIFO write. The 256-bit mode control logic 514 generates control signals to allow the integer multiplier 360 to perform 256-bit multiplication if requested through the state of the multiplicand for the problem.

The state machine waits for four quad words (operands) to be written into the input FIFOs 502, 504 before starting its first 256 (4×64) bit×64 bit multiply. Thus, there is a four clock cycle minimum latency from when the first quad word is dequeued from the MMP output FIFOs 324 until the multiplier 360 can start the multiply operation.

The multiplier 360 performs a total of 16 259×67 bit multiplies and uses the carry save accumulator 506 to add the 16 partial products of these multiplies together from the 1030 bit result. The result of the carry save accumulator 506 is also in carry save format. The multiplier 360 computes the 1030 bit result least significant quad word first which requires alignment of the data through the use of shift operations (right by 64-bits). Result data is stored in the accumulator FIFOs 508. Data being read from the accumulator FIFOs 508 is also in carry save format. The carry and sum data is dequeued from the accumulator FIFO in fifteen 64-bit chunks and a final 70 bit chunk. The carry and sum values are then fed into a final 64 bit adder 510 that produces the final multiplier result that is returned to the input FIFO 322 of the MMP 218a, 218b.

Figure 6:
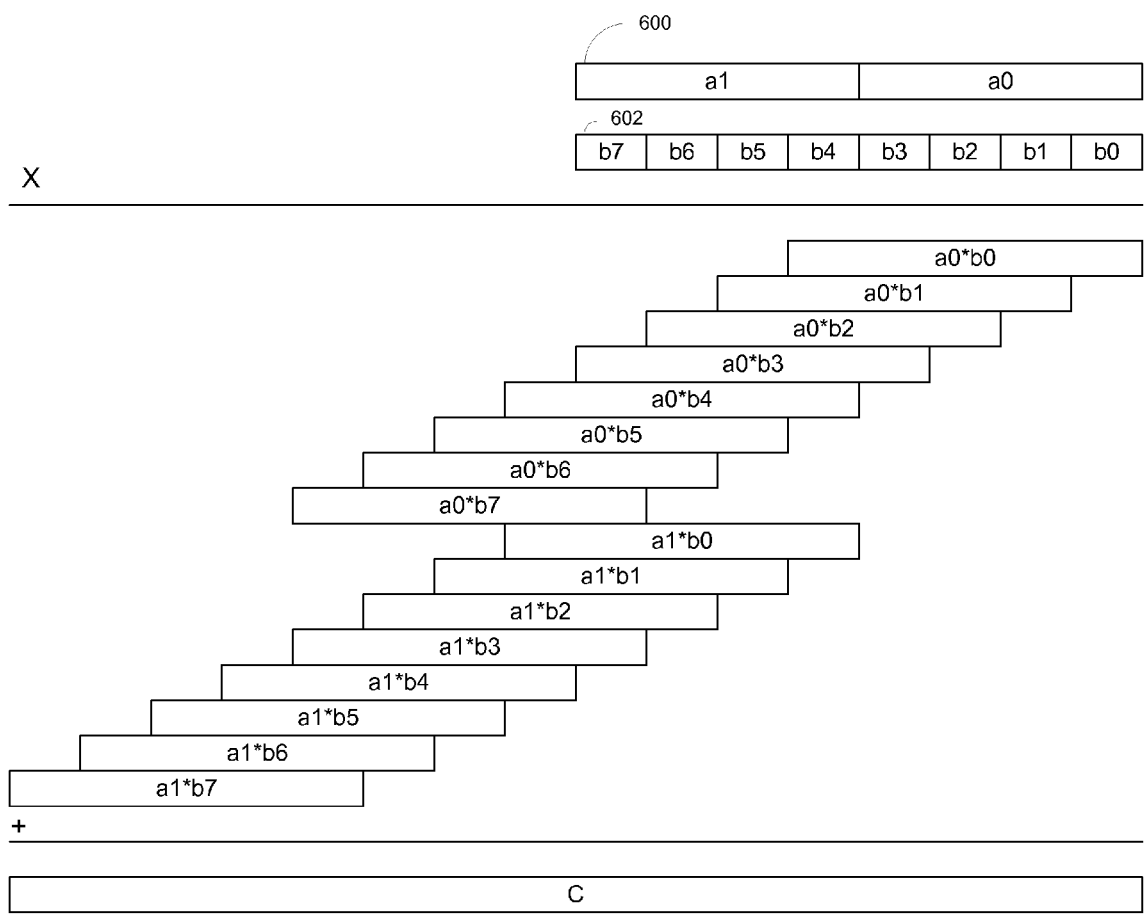
FIG. 6 is a block diagram illustrating a 512-bit multiplication by the integer multiplier shown in FIG. 5.

FIG. 6 is a block diagram illustrating a 512-bit multiplication by the integer multiplier 360 shown in FIG. 5. The CSA multipliers 500 produce products of the form $a_i*b_j$ for a total of 16 partial products with each partial product being 320 bits in length. For example, if a 600 has 512-bits and b 602 has 512-bits, with 4 64-bit multipliers, a 256-bit portion of a may be multiplied by a 64-bit portion of b. The partial products are formed by multiplying the 256-bit portions of a, with one 64-bit portion b, with a having 2 256-bit portions labeled a0-a1 and b having 8 64-bit portions labeled b0-b7. The 16 partial products are computed as follows:

$$a0b0, a0b1, a0b2, a0b3, a0b4, a0b5, a0b6, a0b7$$

$$a1b0, a1b1, a1b2, a1b3, a1b4, a1b5, a1b6, a1b7$$

Figure 7:
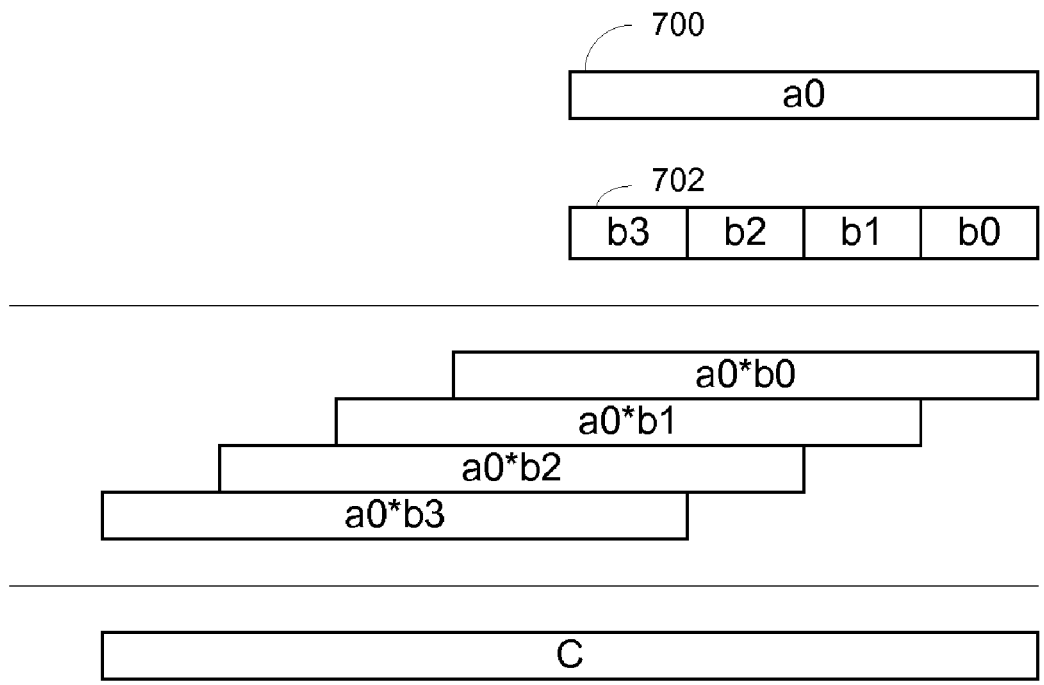
FIG. 7 is a block diagram illustrating a 256-bit multiplication by the integer multiplier shown in FIG. 6.

FIG. 7 is a block diagram illustrating a 256-bit multiplication by the integer multiplier 360 shown in FIG. 6. The CSA multipliers 500 produce products of the form $a_i*b_j$ for a total of 8 partial products with each partial product being 320 bits in length. For example, if a 700 has 256-bits and b 702 has 256-bits, with 4 64-bit multipliers, a 256-bit portion of a may be multiplied by a 64-bit portion of b. The partial products are formed by multiplying the 256-bit portions of a, with one 64-bit portion b, with a 700 having one 256-bit portion labeled a0 and b 702 having 4 64-bit portions labeled b0-b4. The 4 partial products are computed as follows:

a0b0,a0b1,a0b2,a0b3.

Figure 8:
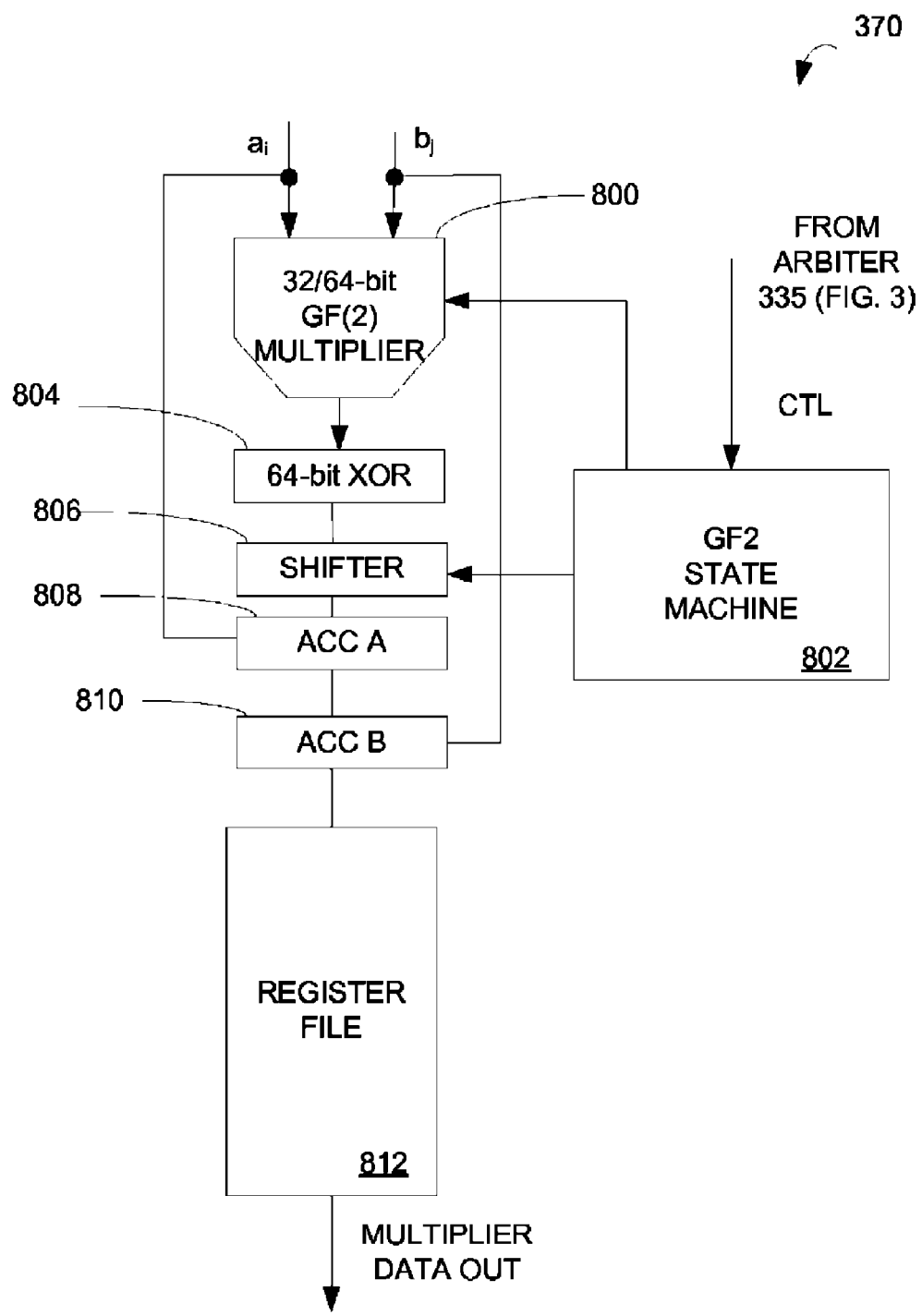
FIG. 8 is a block diagram of an embodiment of the binary multiplier shown in FIG. 4.

FIG. 8 is a block diagram of an embodiment of the binary multiplier 370 shown in FIG. 4. The binary multiplier 370 includes a GF2 multiplier 800 which may be a 32-bit or a 64-bit multiplier. In one embodiment, the size of the multiplier may be 32-bits in order to minimize area used by the GF2 multiplier 800. The binary multiplier 370 also includes 64-bit Exclusive OR (XOR) logic 804, shift logic 806, two accumulators (A and B) 808, 810, a register file 812 and a GF2 state machine 802.

In an embodiment, the GF2 multiplier 800 is a carry-less 64-bit multiplier with an input operand length of k bits. The GF2 multiplier may be constructed in a classical multiplier-array or as a further decomposition of karatsuba (KA) factors of some levels (m). The optimum number of levels (m) may be determined based on a critical path delay and area/gate count.

In one embodiment, the GF2 multiplier 800 is an array multiplier. A critical path delay for an array multiplier may be estimated as $\log_2 k$ XOR delays and one AND gate delay. The value of k is the number of bits in the operand. The delay is computed by weighing a 2-input XOR gate with a factor of 1.5 compared to an AND gate.

In another embodiment, the GF2 multiplier 800 is a KA variant of an array multiplier. A critical path delay of a KA variant multiplier may be estimated as $2m+\log_2 k$ XOR delays and 1 AND gate delay. The value k is the input operand length, for example, k=64 in an embodiment with a 64-bit operand.

The area used by the KA variant may be estimated as:

$$7\left(\frac{3^m}{2}-1\right)+3^m\left(\frac{k}{2^m}-1\right)^2 \text{ XOR gates and } 3^m\left(\frac{k}{2^m}\right)^2 \text{ AND gates.}$$

Based on these formulae, the optimal value for m for a KA variant of a GF2 multiplier for a 64-bit operand is 4. A KA variant with 4 levels of recursion requires only about half of the area of the array multiplier discussed earlier. However, the critical path delay of the KA variant is slower. For example, the critical path delay of the KA variant is 22 gate delays (14 XOR gates, 1 AND gates), while the array multiplier only requires 10 gate delays (6 XOR gates, 1 AND gate). Thus, the selection of whether to use the array multiplier or the Karatsuba variation may be dependent on the clock period if the critical path delay does not exceed the clock period. In an embodiment in which the critical path delay of the Karatsuba variation does not exceed the clock period, the Karatsuba version may be elected because is has the lower gate count.

In an embodiment in which the GF2 multiplier 360 is a 64-bit binary multiplier and the configuration mode specifies A, B as 256-bit operands, the product of A*B can be computed using classical multiplication using products of the form $a_i*b_j$ for a total of 16 partial products with each partial product being 128 bits in length. For example, in an embodiment in which the operand A has 256-bits and operand B has 256-bits, the partial products are formed by multiplying 64-bit portions of A and B, with A having 4 64-bit portions labeled a0-a3 and B having 4 64-bit portions labeled b0-b3. In one embodiment, the 16 partial products are computed as follows:

a0b0, a0b1, a0b2, a0b3 a1b0, a1b1, a1b2, a1b3 a2b0, a2b1, a2b2, a2b3 a3b0, a3b1, a3b2, a3b3

In another embodiment, the partial products may be computed column by column starting with column 0, by multiplying the portions i and j when i+j equals the column number. For example, the first partial product is computed by multiplying a0 by b0 where i=0 and j=0 and I+j=0. The other partial products are computed as follows:

Col 1: a0b0

Col 2: a0b1, b0a1, a2b0

Col 3: a1b1, a0b2, a2b1, a3b0

Col 4: a0b3, a1b2, a1b3, a2b2, a3b0, a3b1

Col 5: a3b2, a2b3

Col 6: a3b3

In another embodiment, Karatsuba multiplication may be used for a 2-level decomposition to produce 9 partial products with each partial product having 128 bits. In yet another embodiment, the product may be computed using one level of classical multiplication and one level of Karatsuba that generates 12 partial products with each partial product having 128 bits.

Similarly, if A and B are 512 bit operands, then the GF2 state machine 802 may be setup in similar ways with one extra level of iteration. The tradeoff between KA and classical decomposition may be chosen based on the latency of the multiply operations and the size of the memory (register file 812) needed for storing partial products.

The type of binary multiplication is selectable through the GF state machine 802 by controlling how portions of the operands (A, B) are selected for the GF2 multiplier 800 and how partial products output from the 64-bit XOR 804 are shifted by the shifter 806.

Figure 9:
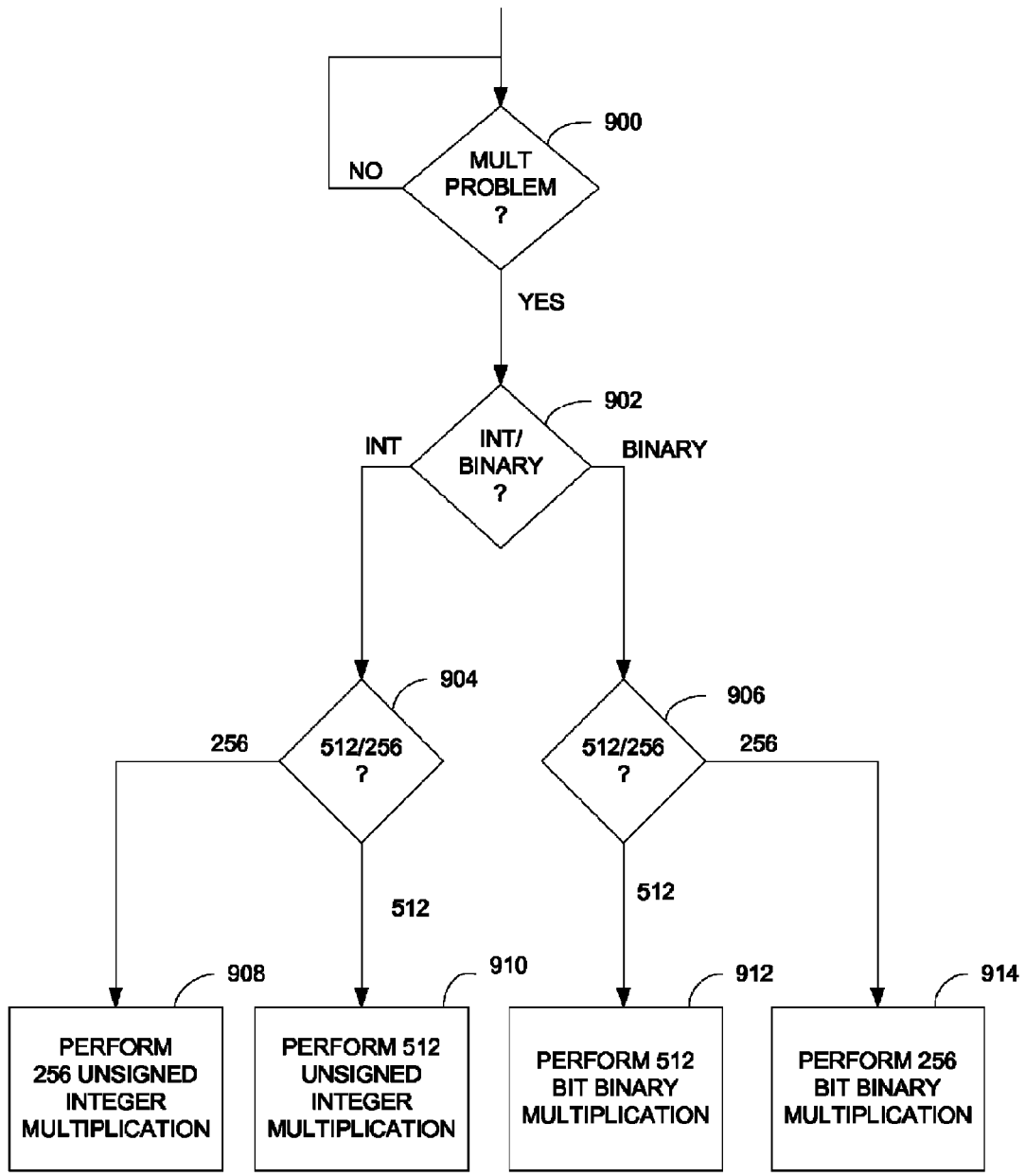
FIG. 9 is a flowgraph illustrating an embodiment of a method for performing binary or integer multiplication for a multiplication problem according to the principles of the present invention.

FIG. 9 is a flowgraph illustrating an embodiment of a method for performing binary or integer multiplication for a multiplication problem according to the principles of the present invention.

At block 900, if a multiplication problem is ready to be operated on by the multiplier 216, processing continues with block 902. If not, processing continues to wait for a multiplier problem to be downloaded to the multiplier 216.

At block 902, a multiplication type associated with the multiplication problem that is downloaded with the operands by the multiplier 216 indicates whether the multiplication operation to be performed is a binary multiplication operation or an integer multiplication operation. If the operation type indicates integer, processing continues with block 904. If the operation type indicates binary, processing continues with block 906.

At block 904, an operand type associated with the multiplication problem that is downloaded with the operands by the multiplier 206 indicates whether the operands are 512-bits or 256-bits. If the operand type indicates 256-bits, processing continues with block 908. If the operand type indicates 512-bits, processing continues with block 910.

At block 906, an operand type associated with the multiplication problem that is received with the operands by the multiplier 206 indicates whether the operands are 512-bits or 256-bits. If the operand type indicates 512-bits, processing continues with block 912. If the operand type indicates 256-bits, processing continues with block 914.

At block 908, the integer multiplier 360 performs unsigned integer multiplication using 256-bit operands.

At block 910, the integer multiplier 360 performs unsigned integer multiplication using 512-bit operands.

At block 912, the binary multiplier 370 performs binary multiplication using 512-bit operands.

At block 914, the binary multiplier 370 performs binary multiplication using 256-bit operands.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

What is claimed is:

1. An apparatus comprising:
a binary multiplier;
a set of integer multipliers which are distinct from each other, each of said set of integer multipliers to operate independently from the binary multiplier; and
a memory to store operands for a multiplication problem, the memory shared by the binary multiplier and the integer multiplier, the multiplication problem to be performed using the stored operands by a selected one of the multipliers, the one of the multipliers selected dependent on a multiplier type associated with the multiplication problem;
wherein the binary multiplier is a carryless multiplier optimized to perform binary multiplication and the integer multiplier is a carry save multiplier optimized to perform unsigned integer multiplication.

2. The apparatus of claim 1, wherein the size of the operands is 256 bits.

3. The apparatus of claim 1, wherein the size of the operands is 512 bits.

4. The apparatus of claim 1, wherein a non-selected one of the multipliers is idle while the selected one of the multipliers operates on the multiplication problem.

5. The apparatus of claim 1, wherein a size of the operands is configurable.

6. The apparatus of claim 1, wherein the binary multiplier includes a core Galois Field ($2^m$) multiplier having a 32-bit operand length.

7. The apparatus of claim 1, wherein the binary multiplier includes a core Galois Field ($2^m$) multiplier having a 64-bit operand length.

8. A method comprising:
storing operands in a computer readable memory shared by a binary multiplier and a set of integer multipliers for a multiplication problem, wherein said set of integer multipliers are distinct from each other and each of said set of integer multipliers operates independently from the binary multiplier; and
selecting one of the multipliers to perform a multiplication problem using the stored operands dependent on a multiplier type associated with the multiplication problem;
wherein the binary multiplier is a carryless multiplier optimized to perform binary multiplication and the integer multiplier is a carry save multiplier optimized to perform unsigned integer multiplication.

9. The method of claim 8, wherein a non-selected one of the multipliers is idle while the selected one of the multipliers operates on the multiplication problem.

10. The method of claim 8, wherein a size of the operands is configurable.

11. The method of claim 10, wherein the size of the operands is 256 bits.

12. The method of claim 10, wherein the size of the operands is 512 bits.

13. The method of claim 8, wherein the binary multiplier includes a core Galois Field ($2^m$) multiplier having a 32-bit operand length.

14. The method of claim 8, wherein the binary multiplier includes a core Galois Field ($2^m$) multiplier having a 64-bit operand length.

15. A system comprising:
a dynamic random access memory to store data and instructions; and
a processor coupled to said memory to execute the instructions, the processor comprising:
a binary multiplier;
a set of integer multipliers which are distinct from each other, each of said set of integer multipliers to operate independently from the binary multiplier; and
a memory to store operands for a multiplication problem, the memory shared by the binary multiplier and the integer multiplier, the multiplication problem to be performed using the stored operands by a selected one of the multipliers, the one of the multipliers selected dependent on a multiplier type associated with the multiplication problem;
wherein the binary multiplier is a carryless multiplier optimized to perform binary multiplication and the integer multiplier is a carry save multiplier optimized to perform unsigned integer multiplication.

16. The system of claim 15, wherein a non-selected one of the multipliers is idle while the selected one of the multipliers operates on the multiplication problem.

* * * * *